United States Patent [19]

Fukumitsu et al.

[11] Patent Number: 4,507,769
[45] Date of Patent: Mar. 26, 1985

[54] DISC REPRODUCING APPARATUS

[75] Inventors: Akira Fukumitsu; Shigetoshi Sagara, both of Fukaya, Japan

[73] Assignee: Tokyo Shibaura Denki Kabushiki Kaisha, Japan

[21] Appl. No.: 401,712

[22] Filed: Jul. 26, 1982

[30] Foreign Application Priority Data

Jul. 29, 1981 [JP] Japan ................................ 56-118753

[51] Int. Cl.$^3$ .................. G11B 21/02; G11B 9/06; G11B 23/04
[52] U.S. Cl. .................................... 369/77.2; 369/221
[58] Field of Search ....................... 369/77.2, 219, 221

[56] References Cited

U.S. PATENT DOCUMENTS

| 4,152,728 | 5/1979 | Camerik | 369/219 |
| 4,198,057 | 4/1980 | Miura | 369/67 |
| 4,227,699 | 10/1980 | Torrington | 369/221 |
| 4,351,046 | 9/1982 | Elliott | 369/77.2 |
| 4,426,695 | 1/1984 | Moriki et al. | 369/77.2 |
| 4,468,764 | 8/1984 | Fukumitsu | 369/77.2 |

Primary Examiner—Steven L. Stephan
Attorney, Agent, or Firm—Cushman, Darby & Cushman

[57] ABSTRACT

A disc reproducing apparatus comprises a turntable rotatably supporting a disc and a cartridge movable between a reproduction start position and a reproduction end position. The cartridge is urged by the spring toward the reproduction start position and moved from the reproduction start position to the reproduction end position by a driving mechanism. The driving force of the driving mechanism is transmitted to the cartridge in a reproducing condition by a clutch assembly and is not transmitted in a nonreproducing condition. The cartridge is held in the reproduction start position by the spring in the nonreproducing condition.

9 Claims, 17 Drawing Figures

DISC REPRODUCING APPARATUS

BACKGROUND OF THE INVENTION

The present invention relates to a disc reproducing apparatus wherein a disc is inserted into the apparatus by inserting a casing housing the disc therein, and the loaded disc may be removed from the apparatus by inserting the empty casing within the apparatus.

Generally, in a disc reproducing apparatus of this type, a disc, such as a video disc, is placed on a turntable, and information recorded on the video disc is reproduced by bringing a reproducing stylus in contact with the video disc. The information includes video signals and audio signals, and is recorded with very high density according to a PCM (pulse code modulation) recording system. If any foreign matter, such as dust or dirt, sticks to the video disc, therefore, reproduced pictures will be subject to noise. Accordingly, there have been developed various apparatus enabling an operator to set on and remove the video disc from the turntable without directly touching the disc.

Meanwhile, the video disc is housed in a casing opening at one side while it is surrounded by a retaining frame which is locked to the casing. In this state, the video disc is inserted into the reproducing apparatus through one side thereof. When the insertion is completed, the video disc, together with the retaining frame, is held within the reproducing apparatus, and the retaining frame is unlocked from the casing. When the casing is drawn out of the reproducing apparatus, both the video disc and the retaining frame are removed from the casing through one side thereof and are stayed in the reproducing apparatus, so that the casing is emptied. In this state, reproducing operation is started. If the empty casing is inserted into the reproducing apparatus through the one side thereof after the reproducing operation is ended, the video disc, together with the retaining frame, is put into the casing through the one side thereof, and the retaining frame is locked to the casing. Then, if the casing is drawn out of the reproducing apparatus, the video disc and the retaining frame are taken out of the apparatus while they are contained in the casing.

In a disc reproducing apparatus of this type, the cartridge is generally forwarded from the start position in accordance with the rotation of the disc by the driving force of a motor and it is backwarded to the start position by the driving force. The backward movement of the cartridge with this method is timeconsuming and immediate reproduction of the next disc or the opposite surface of the same disc may not be prevented untill the cartrige returns to the start position. Immediate reproduction from another disc or the other surface of the same disc may be realized by incorporating two motors each for driving the cartridge in the forward and backward directions independently of eaqh other. This may alternatively be performed by the use of a reversible motor and a reduction gear mechanism for changing the transmission ratio according to the direction of rotation of the reversible motor. With this arrangements, according to the direction of rotation of the reversible motor, the speeds of the cartridge in the forward and backward directions are made different from each other. However, these arrangements result in a complex configuration and high cost of the overall apparatus. Moreover, troubles occur more frequently.

Even if the cartridge can be returned to the start position at high speed by the motor, the cartridge bounces at the start position upon such high-speed movement. This results in deviation of the cartridge position from the start position. This deviation causes damage to the stylus or a tracking error. For this reason, a holding means for holding the cartridge upon its return movement must be incorporated. The holding means may securely hold the cartridge in position. However, the holding force of the holding means acts as a load on the motor. Thus, a high-output motor must be used.

SUMMARY OF THE INVENTION

The present invention has been made in consideration of the above-mentioned circumstances and is intended to provide a disc reproducing apparatus which allows a cartridge to automatically return to a reproducing start position and prevents rebound of the cartridge at this position.

According to an aspect of the present invention, there is provided an apparatus for reproducing signals recorded on a disc, comprising a turntable rotatably supporting the disc; a cartridge movable between a reproduction start position and a reproduction end position; first urging means urging the cartridge toward the reproduction start position; first driving means for moving the cartridge from the reproduction start position toward the reproduction end position by a driving force thereof; and clutch means disposed between the cartridge and the first driving means, for transmitting the driving force of the first driving means to the cartridge in a reproducing condition and for releasing the cartridge from the driving force in a nonreproducing condition, whereby the cartridge is held in the reproduction start position by the first urging means in the nonreproducing condition.

DETAILED DESCRIPTION OF THE PREFERRED EMBODIMENT

There will now be described in detail one embodiment of a disc reproducing apparatus according to the present invention with reference to the accompanying drawings.

Figure 1:
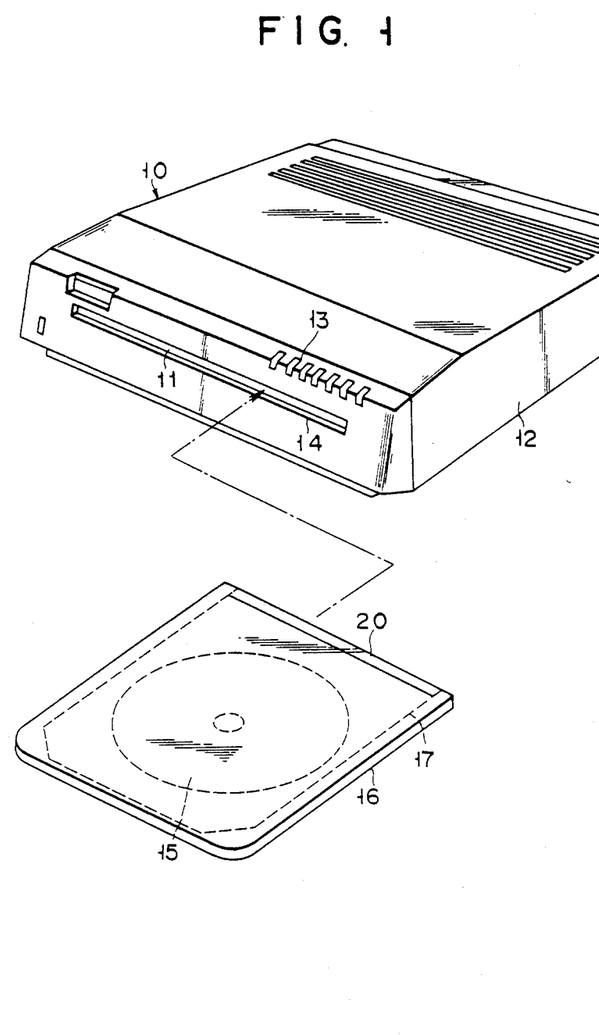
FIG. 1 is a perspective view showing one embodiment of a disc reproducing apparatus according to the present invention together with a video disc.

In this embodiment, as shown in FIG. 1, the disc reproducing apparatus is a video disc player 10 provided with a housing 12. Arranged on the top surface of the housing 12 are plurality of operating buttons 13 for designating various operation modes provided. Provided on the front side face of the housing 12 is a horizontally extending insertion inlet 14 in which a casing 16 is inserted. The housing 12 is provided with a cover 11 operably closing the insertion slot 14. The housing 12 contains a reproducing mechanism (not shown) for reproducing information recorded on a video disc 15.

The video disc 15 is kept in the casing 16 with a retaining frame 17 all times except when being played in the player 10. Therefore, the video disc 15 is not exposed to the outside, and hence is kept from being soiled by direct touch of fingers.

Figures 2, 3:
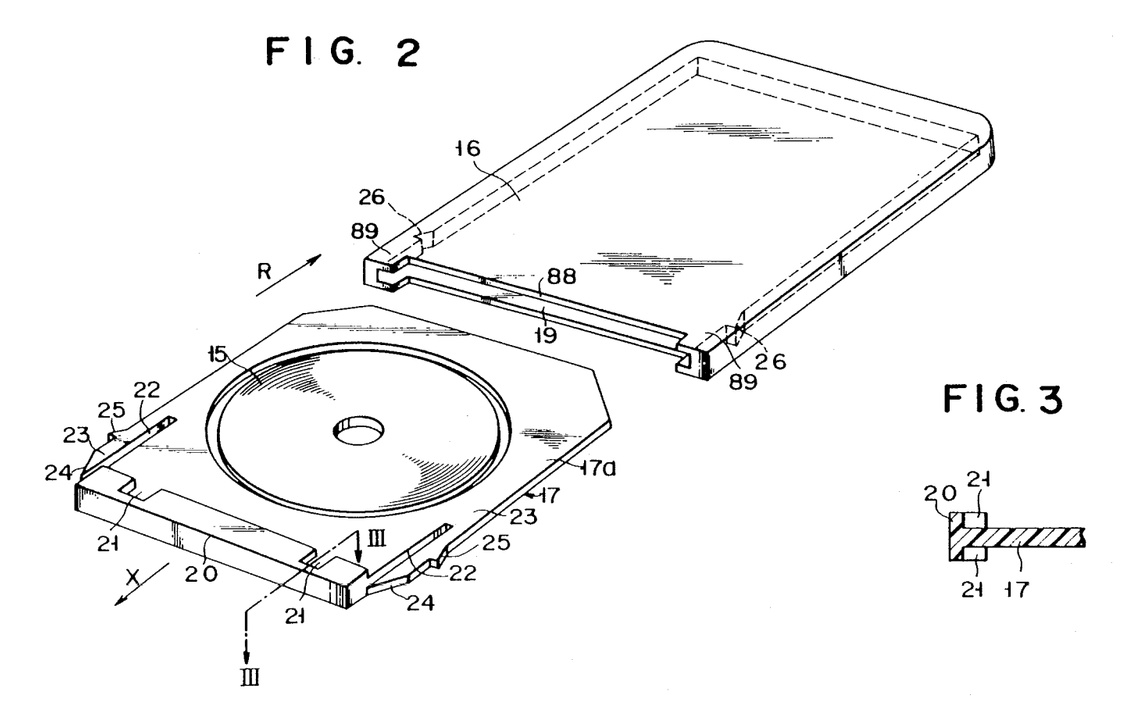
FIG. 2 is a perspective view showing the video disc together with a casing and a retaining frame.
FIG. 3 is a sectional view of the retaining frame shown in FIG. 2 taken along the line III—III.

As shown in FIG. 2, the video disc 15 is disposed in a through hole 18 which has a diameter slightly greater than the diameter of the video disc 15 and is surrounded by the central portion of the retaining frame 17. Thus, the video disc 15 is allowed to move in the horizontal direction with the retaining frame 17, and to move freely in the vertical direction independently of the retaining frame 17. The casing 16 is in the form of a thin box having an access opening 19 in one side face. The video disc 15 is inserted, together with the retaining frame 17, in a direction shown by an arrow R, to the casing 16 through the opening 19.

The retaining frame 17 includes a frame body 17a which is slightly thicker than the video disc 15 and slightly thinner than the height of the opening 19 of the casing 16, and which has the through hole 18 in the center thereof, and a bank portion 20 formed on that side of the frame body 17a which extends at right angles to the inserting direction R and having a thickness substantially equal to the height of the casing 16. Recesses 21 are formed at both end portions of the bank portion 20. The bottom of each recess 21 is flush with the top surface of the frame body 17a. As shown in FIG. 3, the recesses 21 are formed on both top and bottom sides of the bank portion 20. Formed on both sides of the frame body 17a of the retaining frame 17 are slits 22 each extending over a given length from one end along the inserting direction R. Each slit 22 defines an elastic strip 23. An outwardly projecting claw 25 is formed in the middle of each elastic strip 23. The claw 25 is composed of a stop surface at right angles to the inserting direction R and a pressing surface inclined inwardly in the inserting direction R. The outer side face of the tip end portion of each elastic strip 23 is composed of a slant face 24 inclined inwardly in the opposite direction to the inserting direction R.

Stop notches 26 capable of receiving their corresponding claws 25 of the retaining frame 17 are formed on the inner side faces of the casing 16. When the retaining frame 17 is entirely swallowed up by the casing 16, both claws 25 are urged to get into their corresponding stop notches 26 of the casing 16 by the elasticity of the elastic strips 23, thereby locking the retaining frame 17 to the casing 16. In such a locked state, the bank portion 20 completely blocks up the opening 19 of the casing 16, thus keeping dust from penetrating into the casing 16 to soil the video disc 15. Since the retaining frame 17 is locked to the casing 16 by the engagement between the claws 25 and the stop notches 26, you will never be able to pull out the video disc 15 from the casing 16 with your hand on the bank portion 20.

Figure 4:
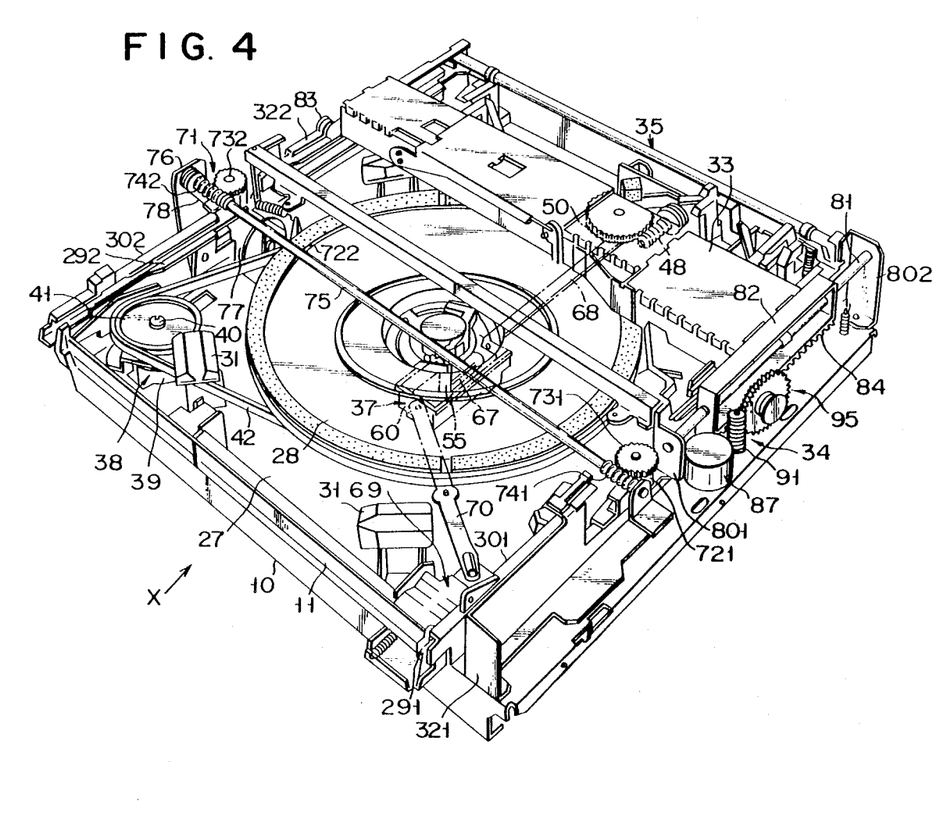
FIG. 4 is a perspective view showing the internal mechanism of the disc reproducing apparatus.

Referring now to FIG. 4, there will be described a guide mechanism for the casing 16 inside the player 10.

As shown in FIG. 4, a horizontally extending chassis 27 is disposed in the housing 12 of the player 10. A turntable 28 with a diameter smaller than that of the video disc 15 is mounted on the chassis 27. The turntable 28 is designed to be moved vertically by a first driving mechanism 37 (described later) and rotated by a second driving mechanism 38 (described later). A pair of guide rails 301 and 302 are fixed on the chassis 27, extending parallel to an inserting direction indicated by an arrow X (opposite to the aforesaid inserting direction R). One end of each of the guide rails 301 and 302 is located at each corresponding end portion of the inserting slot 14 shown in FIG. 1. The guide rails 301 and 302 are each provided with groove portions 291 and 292, respectively, to receive their corresponding side portions of the casing 16, the groove portions having a given distance above the top surface of the chassis 27. The guide rails 301 and 302 are long enough to allow the retaining frame 17 to be entirely swallowed up by the housing 12.

The guide rails 301 and 302 are attached to the chassis 27 by means of a pair of auxiliary chassis 321 and 322, respectively. A cartridge 33 is stretched between the two auxiliary chassis 321 and 322, extending at right angles to the direction of the arrow X. The cartridge 33 is allowed to move along the direction of the arrow X, described in detail later. One auxiliary chassis 322 is fitted with a third driving mechanism 34 (described later) for driving the cartridge 33. The cartridge 33 is fitted with a reproducing stylus (not shown), which contacts a groove on the video disc 15 set on the turntable 28 to pick up audio/video signals recorded on the video disc 15.

Four support members 31 are arranged on the region of the chassis 27 around the turntable 28. These support members 31 support the inner peripheral edge portion of the frame body 17a and the outer peripheral portion of the video disc 15 while the video disc 15 is entirely contained in the housing 12. In the non-operating state, the top surface of the turntable 28 is located below the top surfaces of the support members 31. The top surfaces of the support members 31 are substantially flush with the under surfaces of the groove portions 291 and 292 of the guide rails 301 and 302.

Disposed on that portion of the chassis 27 which faces the other end portions of the guide rails 301 and 302 is a holding device 35 to hold the bank portion 20 of the retaining frame 17. The holding device 35 so functions as to unlock the retaining frame 17 from the casing 16 and hold the same when the casing 16 containing the video disc 15 is inserted in the housing 12. The holding device 35 also functions to release the hold of the retaining frame 17 and lock the same to the casing 16 when the empty casing 16 is inserted in the housing 12 for retrieving the video disc 15 from the housing 12 after the reproducing operation is ended.

Figure 5A:
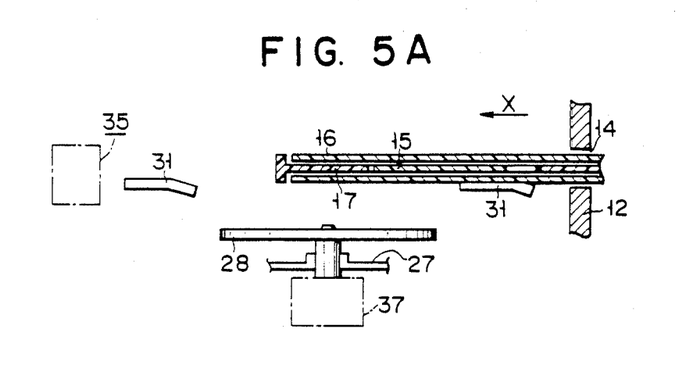
FIGS. 5A to 5C are side sectional views schematically showing the operation modes of a turntable.
Figure 5B:
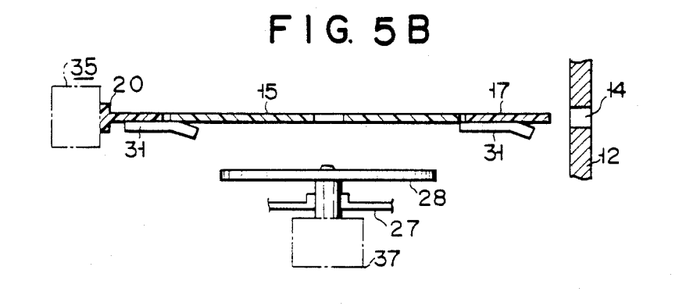
Figure 5C:
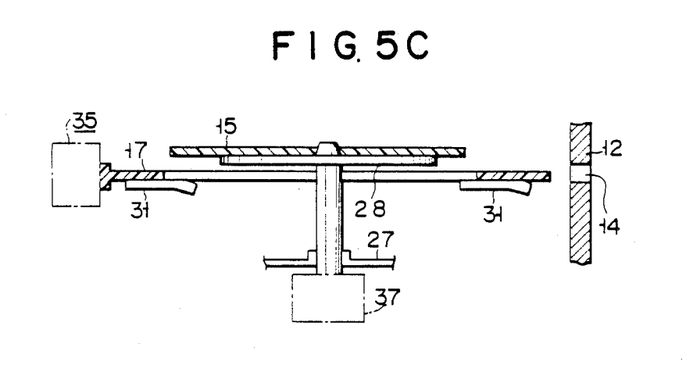

Referring now to FIGS. 5A to 5C, there will be described the way of inserting the video disc 15.

First, the casing 16 containing the video disc 15 is inserted through the insertion slot 14 into the housing 12. Both side portions of the casing 16 are regulated and guided in inward movement by the respective groove portions 291 and 292 of the guide rails 301 and 302. At this time, the turntable 28 is located below the support members 31, as shown in FIG. 5A, so that the casing 16 can be inserted without hindrance.

If the casing 16 is further pushed in from the position shown in FIG. 5A, the one end portion of the casing 16 abuts against the holding device 35. By the agency of the holding device 35, the bank portion 20 of the retaining frame 17 is stopped, and the casing 16 and the retaining frame 17 are unlocked or disengaged from each other. If the casing 16, in this state, is pulled out, the retaining frame 17, held by the holding device 35, remains within the housing 12, accompanied with the video disc 15, while the casing 16 is emptied and taken out of the housing 12. Accordingly, the retaining frame 17 and the video disc 15 are supported by the four support members 31, as shown in FIG. 5B.

In the state shown in FIG. 5B, if one of the operating buttons 13 is depressed to give instructions for the start of reproducing operation, the turntable 28 first ascends to bear the video disc 15 thereon, and further rises to elevate the disc 15. Thus, the video disc 15 is brought to the position higher than the support members 31, and released from the support thereby, as shown in FIG. 5C. In the state of FIG. 5C, the turntable 28 rotates, the cartridge 33 moves to a predetermined position, and audio/video signals are picked up from the video disc 15 by the reproducing stylus.

When the reproducing operation is completed, the turntable 28 ceases to rotate. Then, the turntable 28 descends to the position shown in FIG. 5B, and the video disc 15 comes to be supported by the support members 31. If, in this state, the empty casing 16 is inserted through the insertion slot 14 into the housing 12 with its one end portion (at which the opening 19 is formed) forward until the one end portion of the casing 16 abuts against the bank portion 20 of the retaining frame 17, then the retaining frame 17 is locked to the casing 16, and the holding device 35 releases its hold of the retaining frame 17. If the casing 16 is pulled out, therefore, the video disc 15 is taken out of the housing 12 while it is housed together with the retaining frame 17 in the casing 16, as shown in FIG. 5A.

The internal mechanism in the housing 12 will now be described with reference to FIG. 4.

A second motor 34 as the second drive mechanism 38 is arranged with its rotating shaft 40 extending vertically. A pulley 41 is coaxially mounted on the upper end of the rotating shaft 40. A belt 42 is stretched between the turntable 28 and the pulley 41. Since the driving force of the motor 34 is transmitted to the turntable 28 through the belt 42, the driving force may be transmitted even if the turntable 28 moves vertically.

Figure 6:
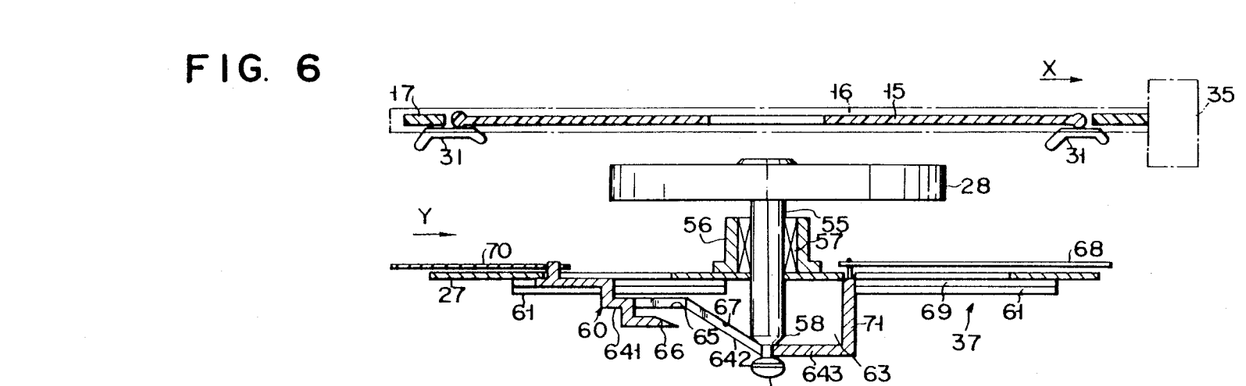
FIG. 6 is a side sectional view showing a first drive mechanism in the nonreproducing condition.
Figure 7:
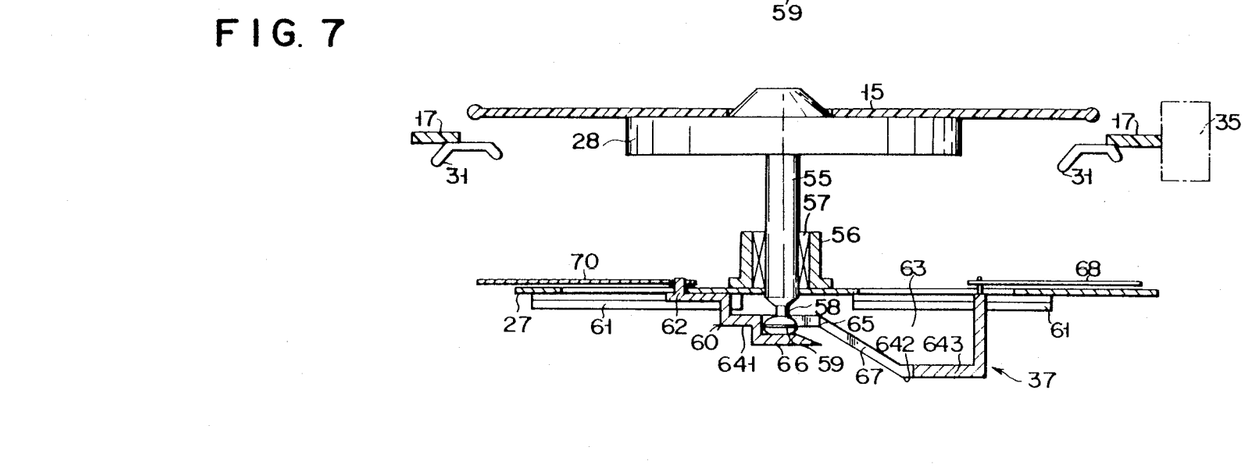
FIG. 7 is a side sectional view showing the first drive mechanism in the reproducing condition.
Figure 8:
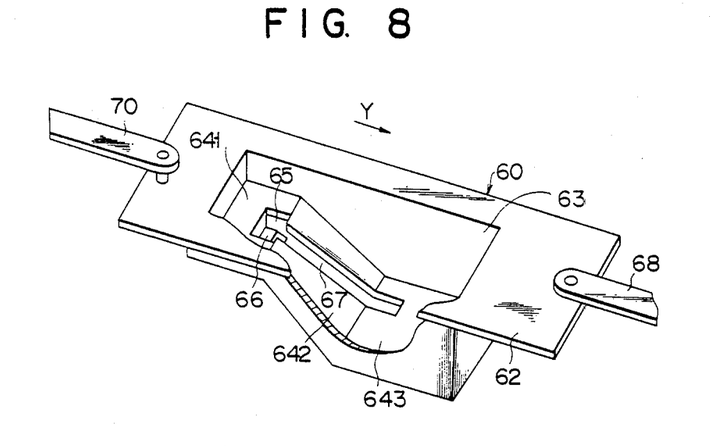
FIG. 8 is a partially cutaway, perspective view of a slider used for the first drive mechanism.

The first drive mechanism 37 regulating the vertical movement of the turntable 28 will be described in detail with reference to FIGS. 6 to 8.

The turntable 28 has a coaxial rotating shaft 55 fixed at its center. The lower end portion of the rotating shaft 55 is located below the chassis 27. The middle portion of the rotating shaft 55 is provided in a receiver 56 mounted on the upper surface of the chassis 27. A bearing 57 allows movement of the rotating shaft 55 about the axis as well as movement along the axis (i.e., vertical movement). An annular groove 58 is formed at the lower end portion of the rotating shaft 55 and a bottom surface 59 of the rotating shaft 55 is formed by a smooth arcuated surface.

The position of the turntable 28 along the axis is defined by a slider 60. The slider 60 is slidably supported by a pair of slider supports 61 mounted at the lower surface of the chassis 27 along the direction shown by an arrow Y. The slider 60 shown in detail in FIG. 8 has a base plate 62. A recess 63 is formed at substantially the center of the base plate 62. The bottom surface of the recess 63 is constituted by a first flat bottom plate 641 having a predetermined depth from the level of the base plate 62, an inclined bottom plate 642 adjacent to the first flat bottom plate 641 increasing inclination downward in a opposite direction to the direction shown by the arrow Y, and a second flat bottom plate 643 adjacent to the inclined bottom plate 642 and having a depth, from the bottom surface of the first flat bottom plate 641, corresponding to the vertical movement of the turntable 28. These plates are arranged in the order named in the opposite direction to the direction shown by the arrow Y.

A large opening 65 is formed at that portion of the first flat bottom plate 641 which is adjacent to the inclined bottom plate 642. A supporting plate 66 which receives the bottom surface 59 of the rotating shaft 55 is mounted at the first flat bottom plate 641. The supporting plate 66 is disposed parallel to the first flat bottom plate 641 and being spaced apart therefrom. The distal end of the supporting plate 66 is tapered in order to receive the bottom surface of the rotating shaft 55.

A groove 67 is formed along the direction shown by the arrow Y in the inclined plate 642 and a part of the second flat bottom plate 643, which is continuous with the opening 65. The width of the groove 58 is smaller than the diameter of the rotating shaft 55 and larger than the diameter of the annular groove 58. The rotating shaft 55 is supported on the slider 60 through engagement of the periphery of the groove 67 and the periphery of the annular groove 58 of the rotating shaft 55 described above.

Figure 9:
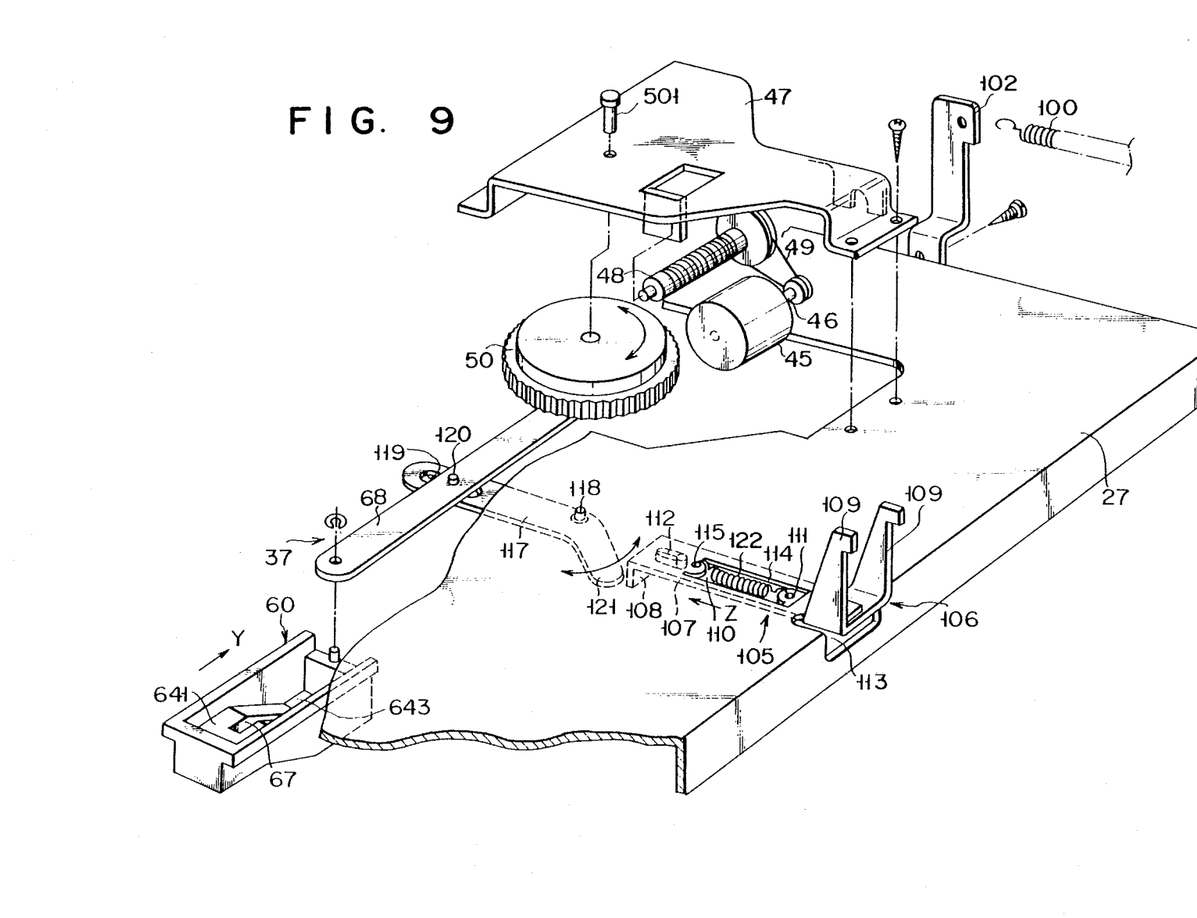
FIG. 9 is an exploded perspective view showing the first drive mechanism together with a control mechanism.

One end of a drive lever 68 is coupled to the rear part of the base plate 62 of the slider 60 at a down stream side along the direction indicated by arrow Y. The other end of the drive lever 68 is connected to a first motor 45. As shown in FIG. 9, the first motor 45 is secured to the chassis 27 by a mount plate 47. A worm 48 is rotatably mounted to this mount plate 47 parallel to a rotating shaft 46. A belt 49 is stretched between the worm 48 and the rotating shaft 46 so as to transmit the driving force of the first motor 45 to the worm 48 through the belt 49. A worm wheel 50 is pivotally mounted to the mount plate 47 to engage in mesh with the worm 48. The rotating axis of the worm wheel 50 vertically extends. The other end of the drive lever 68 is eccentrically and pivotally mounted to the under surface of the worm wheel 50. In the reproducing condition, the other end of the drive lever 68 is located at that portion of the worm wheel 50 which is positioned on opposite side of the slider 60 with the rotating axis of the worm wheel 50 therebetween. In the nonreproducing condition, the other end of the drive lever 68 is moved to the side of the slider 60 with the pivotal movement of the worm wheel 50, that is the slider 60 is moved along the direction opposed to the direction shown by the arrow Y.

The mode of operation of the first drive mechanism 37 of the turntable 25 will be described hereinafter. The operation button 13 is depressed to start reproduction from the nonreproducing condition shown in FIG. 6. Then, the first motor 45 rotates the worm wheel 50 through 180°. By this pivotal movement, the drive lever 68 moves the slider 60 in the direction indicated by arrow Y. The rotating shaft 55 is guided by the groove 67 and lifted up by the inclined surface of the plate 642. The video disc 15 is lifted up and received by the turntable 28. When the rotating shaft 55 is placed in the opening 65 of the first flat bottom plate 643, the video disc 15 is in its reproducing condition as shown in FIG. 7. The turntable 28 is driven by the second drive mechanism 38.

After reproduction, the second drive mechanism 38 stops driving the turntable 28. The first motor 45 of the first drive mechanism 37 rotates the worm wheel 50 through another 180° to move the drive lever 68 in the opposite direction of the arrow Y. Then, the slider 60 moves to the opposite direction of the arrow Y. As the result, the rotating shaft 55 is lowered to its lowest position and the video disc 15 which has been placed on the turntable 28 is now supported by the supporting members 31. In this condition, the first motor 45 stops driving the drive lever 68 to interrupt the reproducing operation.

The turntable 28 which vertically moves as above-mentioned manner, takes the upper position where the video disc 15 is placed on the turntable 28 for the reproducing condition. The turntable 28 also takes the lower position where the video disc 15 is not placed on the turntable 28 for the nonreproducing condition. In other words, the reproducing or nonreproducing condition of the video disc player 10 may be confirmed according to the position of the turntable 28 or the slider 60.

As shown in FIG. 4, a locking mechanism 69 is mounted to the cover 11 described above. This locking mechanism 69 and the slider 60 are coupled with an interlocking rod 70. In the reproducing condition of the player 10, the locking mechanism 69 prevents the cover 11 from opening or keeps the cover 11 closed. In the nonreproducing condition of the player 10, the locking mechanism 69 allows the cover 11 to open. In other words, the cover 11 is pivotal freely in this state.

Referring to FIG. 4 again, in the housing 12 a loading mechanism 71 for automatically loading or unloading the casing 16 is arranged. The automatic loading mechanism 71 has a pair of rollers 721 and 722 which are rotatable about vertical axes. The rollers 721 and 722 are located at intermediate position of the guide rails 301 and 302, which are engageable with the outer side surfaces of the inserted casing 16, respectively. Worm wheels 731 and 732 are coaxially fixed to the upper ends of the rollers 721 and 722, respectively. Worms 741 and 742 are arranged to mesh with these worm wheels 731 and 732. The worms 741 and 742 are provided to both ends of a common interlocking rod 75, respectively. The interlocking rod 75 extends in the direction perpendicular to the loading direction of the casing as indicated by arrow X. A pulley 76 is coaxially fixed to the extreme end of the interlocking rod 75. A third reversible motor 77 is arranged below the roller 722 and fixed on the chassis 27, and has a rotating shaft extending parallel to the extending direction of the interlocking rod 75. A drive pulley (not shown) is coaxially mounted on the rotating shaft of the third motor 77. A belt 78 is stretched between the drive pulley and the pulley 76. The rollers 721 and 722 are rotated in the opposite directions by the third motor 77.

In the automatic loading mechanism 71 as described above, the casing 16 inserted through the insertion inlet 14 via the cover 11 reaches the positions intermediate the guide rails 301 and 302 where the rollers 721 and 722 are arranged. Then, detection switches (not shown) arranged at these positions are turned on. The third motor 77 thus drives the rollers 721 and 722 to automatically load the casing 16 inside the player 10. When the release of the casing 16 from the holding device 35 is detected by another detection switch (not shown), the third motor 77 rotates in the reverse direction and the rollers 721 and 722 carry back the casing until its front end reaches the intermediate positions of the guide rails 301 and 302.

A pair of bent segments 801 and 802 is attached to the first auxiliary chassis 321. A columnar guide rod 81 is extended between the bent segments 801 and 802 along the direction indicated by arrow X. A cartridge guide 82 is slidably mounted on the guide rod 81. One end of the cartridge 33 is fixed to the cartridge guide 82, while the other end thereof is rotatably engaged with the upper surface of the second auxiliary chassis 322 with an anti-friction bearing 83. Accordingly, the cartridge 33 is radially moved when the cartridge guide 82 moves.

Figure 10:
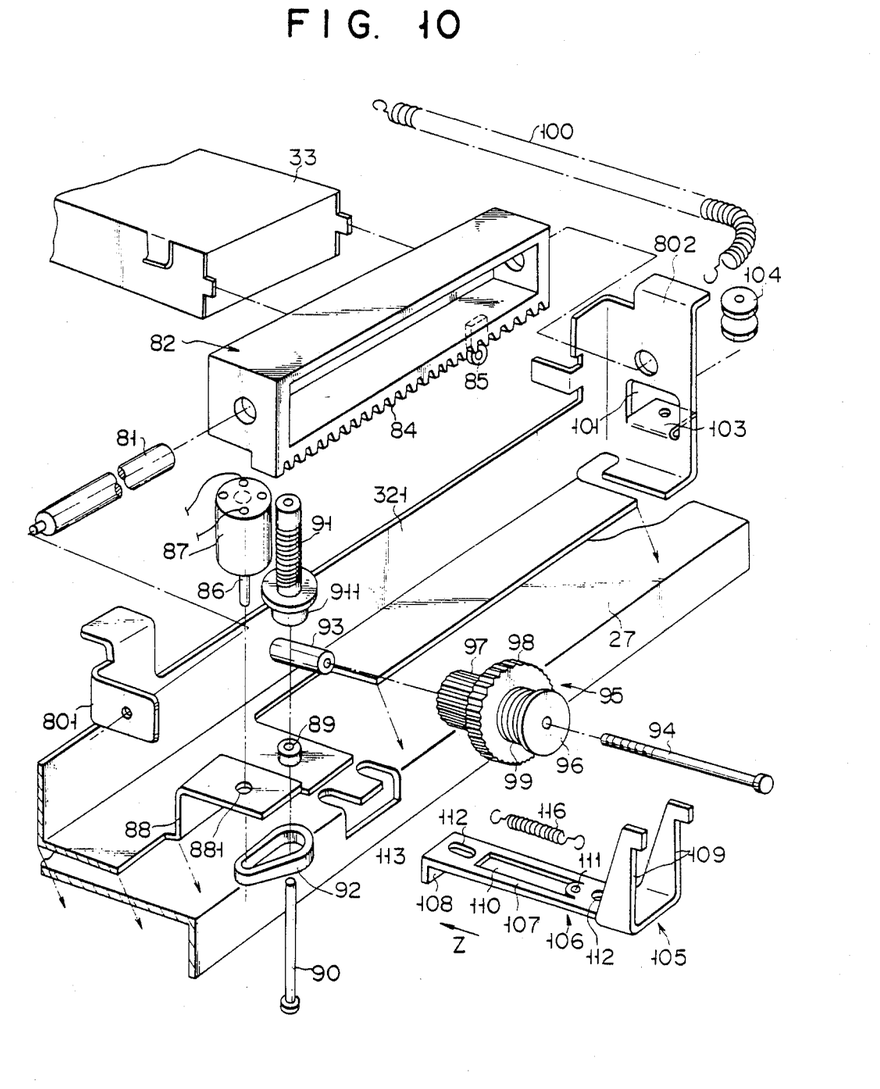
FIG. 10 is an exploded perspective view showing a third driving mechanism.

As shown in FIG. 10, a rack 84 is mounted on the bottom surface of the cartridge guide 82 and a tongue 85 is mounted at a predetermined position of the bottom surface thereof.

The third driving mechanism 34 for driving the cartridge 33 will be described with reference to FIGS. 10 to 15.

The third driving mechanism 34 has a fourth motor 87 with a rotating shaft 86 which rotates around its vertical axis. The fourth motor 87 with the rotating shaft 86 extending downward is mounted on a support segment 88 which is formed on that part of the first auxiliary chassis 321. The rotating shaft 86 is extended through a hole 881 formed in the support segment 88. The bent segment 801 is located above the bottom surface of the first auxiliary chassis 321 by a predetermined distance. A bearing 89 is disposed on that portion of the bottom plate of the first auxiliary chassis 321 which is adjacent to the support segment 88. A support shaft 90 vertically extends through the bearing 89 and rotatably supports a worm 91. A pulley 911 is coaxially mounted at the lower end thereof. A belt 92 is disposed about the rotating shaft 86 and the pulley 911, so that the worm 91 is rotated by the fourth motor 87.

A shaft support 93 is disposed on the vertical plate of the first auxiliary chassis 321. A shaft 94 is horizontally fixed in the shaft support 93 in a direction perpendicular to the insertion direction indicated by arrow X. A clutch assembly 95 is rotatably mounted on the shaft 94.

Figure 13:
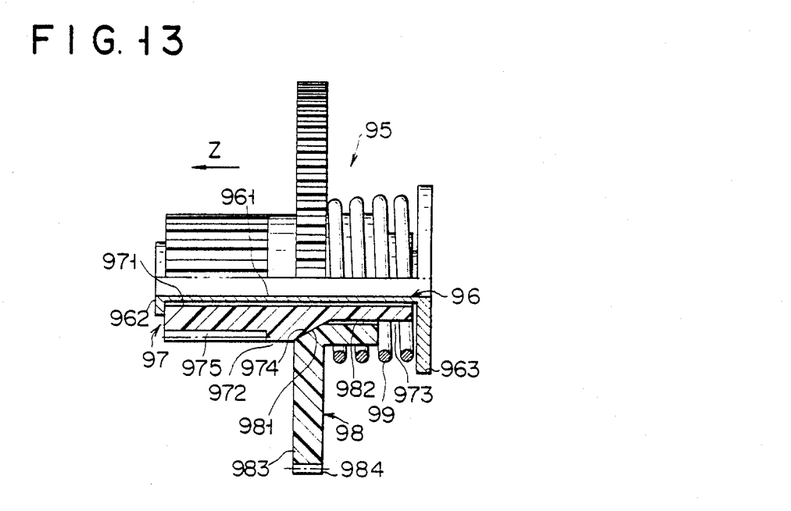
FIG. 13 is a partial sectional view of a clutch assembly in a power transmission enabling condition.
Figure 14:
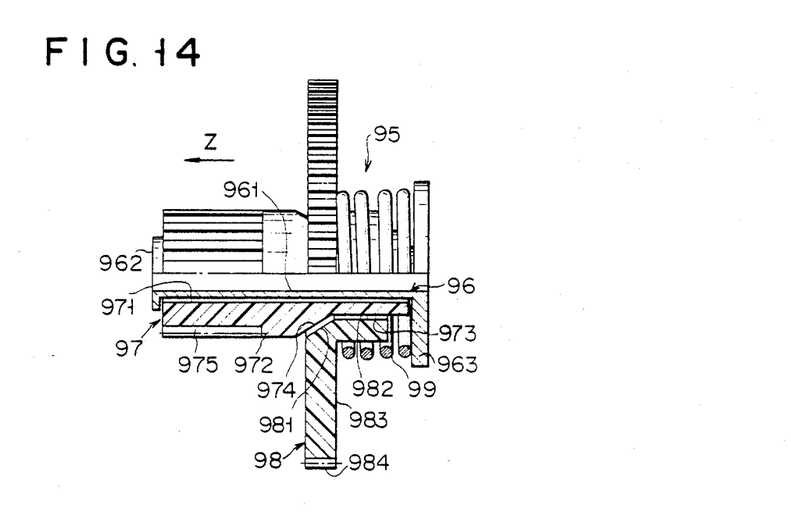
FIG. 14 is a partial sectional view of the clutch assembly in a power transmission disabling condition.

The clutch assembly 95 is arranged to interrupt the transmission power from the fourth motor 87 to the cartridge guide 82 as shown in FIGS. 13 and 14. The clutch assembly 95 has a middle spindle 96 having a through hole at its center through which the shaft 94 is extended. The middle spindle 96 is rotatably mounted on the shaft 94. The middle spindle 96 has a cylindrical body 961 with an even outer surface, a first flange 962 formed at the proximal end of the cylindrical body 961, and a second flange 963 formed at the distal end of the cylindrical body 961.

A first gear portion 97 is rotatably mounted on the outer surface of the middle spindle 96. The first gear portion 97 having a through hole 971 at its center through which the cylindrical body 961 of the middle spindle 96 is extended. The outer surface of the first gear assembly 97 is constituted by a first even surface 972 which is located on the proximal end side and the cross section of which has a large diameter, a second even surface 973 which is located on the distal end side and the cross section of which has a small diameter, and a tapered surface 974 connecting the distal edge of the first surface 972 with the proximal edge of the second surface 973. A gear 975 is formed on the first surface 972 along the circumferential direction and is always meshed with the rack 84 of the cartridge guide 82.

A second gear portion 98 is rotatably and coaxially disposed about the outer surfaces of the second and tapered surfaces 973 and 974 of the first gear assembly 97. The second gear portion 98 has a tapered surface 981 at the inner surface which is engageable with the tapered surface 974 of the first gear portion 97 and it also has a first surface 982 which opposes the second surface 973 of the first gear portion 97 at a distance therefrom. A third flange 983 is formed on the proximal end of the outer surface of the second gear portion 98. A gear 984 which is formed on the entire outer surface of the third flange 983 meshes with the worm 91. Having arranged in a manner mentioned above, the second gear portion 98 is rotatably supported about the first gear portion 97 and is slidable along the central axis of the first gear portion 97 between a position where the tapered surfaces 974 and 981 engage with each other (hereinafter called the first position) and a position where these surfaces are spaced apart from each other (hereinafter called the second position).

The outer periphery of the first flange 962 extends slightly outward from the outer periphery of the cylindrical body 961 so as not to allow dropout of the first gear portion 97 from the middle spindle 96. On the other hand, the outer periphery of the second flange 963 extends greatly outward from the outer periphery of the cylindrical body 961 and extends inward from the outer periphery of the third flange 983. A coil spring 99 is wound around the outer surface of the second gear portion 98. One end of the coil spring 99 is pressed onto the third flange 983 and the other end thereof is pressed onto the second flange 963. The second gear portion 98 is urged by force of the coil spring 99 in the direction indicated by arrow Z in FIG. 15. If the external force does not act on the second gear portion 98, the second gear portion 98 is urged to the first position where the tapered surface 981 of the second gear portion 98 is engaged with the tapered surface 974 of the first gear portion 97. When the tapered surfaces 974 and 981 engage with each other, that is, when the second gear portion 98 is kept in the first position, the first gear portion 97 rotates upon rotation of the second gear portion 98. However, when the second gear portion 98 is moved against the urging force of the coil spring 99 along the direction opposite to the direction indicated by arrow Z, the second gear portion 98 is located in the second position where the tapered surface 981 of the second gear portion 98 is disengaged from the tapered surface 974 of the first gear portion 97. Therefore, when the second gear portion 98 is kept in the second position, the first gear portion 97 is free to rotate. In this condition, even if the second gear portion 98 is moved between the first and second positions, meshing condition between the second gear portion 98 and the worm 91 is maintained.

A coil spring 100 is mounted on the cartridge guide 92, as shown in FIG. 10. The coil spring 100 urges the cartridge guide 82 in the direction indicated by arrow X, so that the cartridge 33 is urged to the reproduction start position. One end of the coil spring 100 is connected to the tongue 85 of the cartridge guide 82, and the other end thereof is connected, through an opening 101 in the bent segment 802, to a mount segment 102 which is raised from the rear end of the chassis 27, as shown in FIG. 9. A support segment 103 is provided on the bent segment 802. A pulley 104 is rotatably mounted on the support segment 103. The coil spring 100 is bent at the pulley 104 in a substantially L shape.

A control mechanism 105 is provided on the chassis 27, which controls on/off operation of the power transmission with the clutch assembly 95.

Figure 11:
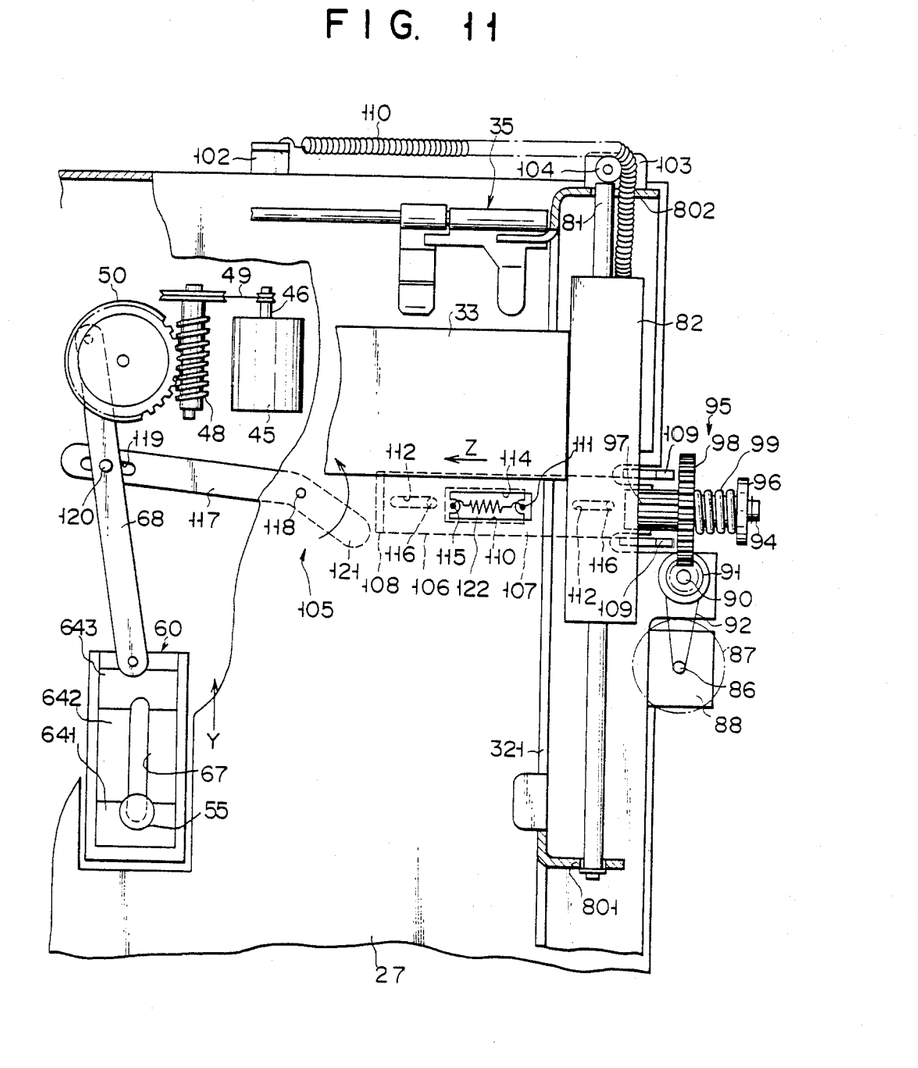
FIGS. 11 and 12 are respectively a plan view and a side view of the third driving mechanism in the reproducing condition.
Figure 12:
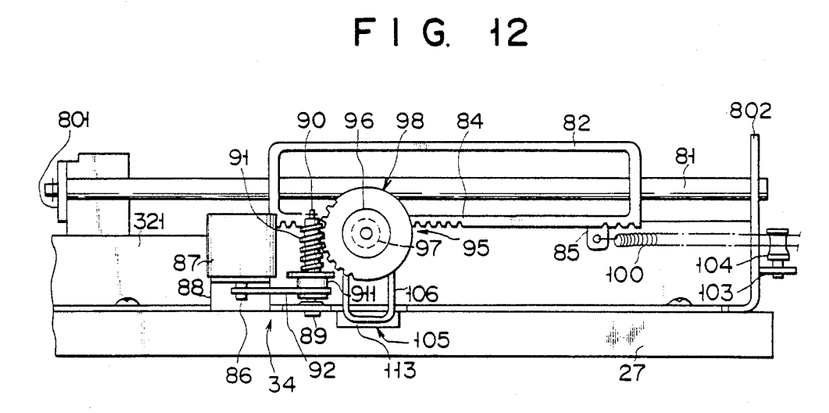

As shown in FIGS. 10 and 11, the control mechanism 105 includes a press member 106 which is movable along the direction indicated by arrow Z. The press member 106 has a plate 107 of which one end is formed a bent segment 108. The other end of the plate 107 is formed with a pair of contact segments 109. The upper ends of the contact segments 109 are adapted to abut against the third flange 983 of the second gear portion 98. A rectangular opening 110 is formed at the center of the plate 107. A small hole 111 is formed adjacent to the opening 110 on the distal end side of the plate 107. Elongated holes 112 are formed in the distal and proximal end portions of the plate 107.

An opening 113 is formed at the corner of the chassis 27 to receive the press member 106. The press member 106 is slidably placed under the chassis 27 and moved between a position where the contact segment 109 does not abut against the second gear portion 98 of the clutch assembly 95 (hereinafter called the third position) and a position where the contact segment 109 abuts against the second gear portion 98 and brings it to the second position (hereinafter called the forth position). When the press member 106 is kept in the third position, the second gear portion 98 is kept in the first position.

An opening 114 is formed on the chassis 27, which is slightly smaller than the opening 110. A small hole 115 is formed adjacent to the opening 114 on the proximal end side of the opening 114. A spring 122 is stretched between the holl 111 and the holl 115 for urging the press member 106 from the fourth position to the third position. A pair of pins 116 are disposed on the lower surface of the chassis 27 and are fitted in the pair of elongated holes 112. The press member 106 is guided to the direction indicated by arrow Z by the pins 116.

The control mechanism 105 has a lever 117 for regulating the position of the press member 106, as shown in FIGS. 9 and 11. The regulation lever 117 is pivotably supported about a pin 118 on the lower surface of the chassis 27. An elongated hole 119 is longitudinally formed at one end of the regulation lever 117. One end of the regulation lever 117 crosses the drive lever 68. At the intersection of the levers 117 and 68, the regulation lever 117 is connected to the drive lever 68 through a pin 120 which is fitted in the elongated hole 119. The other end 121 of the regulation lever 117 is capable of contact with the engaging segment 108 of the press member 106.

In the reproducing condition, the regulation lever takes a position where it is not brought contact with the engaging segment 108 of the press member 106 (hereinafter called the fifth position). When the regulation lever 117 is kept in the fifth position, the press member 106 is brought to the third position, and hence the second gear assembly 98 is brought to the first position. On the other hand, upon movement of the drive lever 68 to the opposite direction of the arrow Y, the regulation lever 117 is moved counterclockwise, the other end 121 is rotated counterclockwise from the fifth position to a position where the regulation lever 117 comes into contact with the engaging segment 108 (hereinafter called sixth position) and brings the engaging segment 108 to the fourth position. The second gear assembly 98 is brought to the second position and the clutch assembly 95 interrupts to transmit the power from the motor 87. The reproducing condition is thus changed to the nonreproducing condition.

The operation of the third driving mechanism 34 with the above arrangement will be described with reference to the operation of the turntable 28.

An operator initiates the reproducing operation after the disc 15 is inserted in the housing 12. The turntable 28 is moved upward by the first driving mechanism 37. The disc 15 is then placed on the turntable 28 and is rotated by the second driving mechanism 38. Meanwhile, the regulation lever 117 of the control mechanism 105 is rotated clockwise (FIG. 9) about the pivot pin 118 upon movement of the drive lever 68 in the direction indicated by arrow Y for causing the turntable 28 to move upward. The other end 121 of the regulation lever 117 is moved from the sixth position to the fifth position as shown in FIG. 11. The press member 106 is thus moved to the third position by the urging force of the spring 116 along the direction indicated by arrow Z. Upon this movement of the press member 106, the contact segments 109 of the press member 106 are apart from the second gear portion 98 which is then moved to the first position by the urging force of the spring 99. Therefore, the tapered surfaces 974 and 981 engage with each other, whereby the clutch assembly 95 is set in the power transmission enabling condition.

Thereafter, the fourth motor 87 of the third driving mechanism 34 is started, and the cartridge 33 is moved against the urging force of the coil spring 100 from the reproduction start position to the opposite direction of the arrow X. The stylus contained in the cartridge 33 is set down through the use of a moving mechanism (not shown) onto the outermost portion of the recording area of the disc 15. Thus, signals are reproduced.

The stylus together with the cartridge 33 is moved on the disc 15 by the third driving mechanism 34. When the stylus reaches the innermost portion of the recording area of the disc 15, it is lifted from the surface of the disc 15. The stylus is then contained again in the cartridge 33. In this condition, the second motor 39 is stopped, so that rotation of the turntable 28 is interrupted. The turntable 28 is then moved downward by the first driving mechanism 37, and the player 10 is brought to the nonreproducing condition. The disc 15 can then be ejected from the housing 12.

Figure 15:
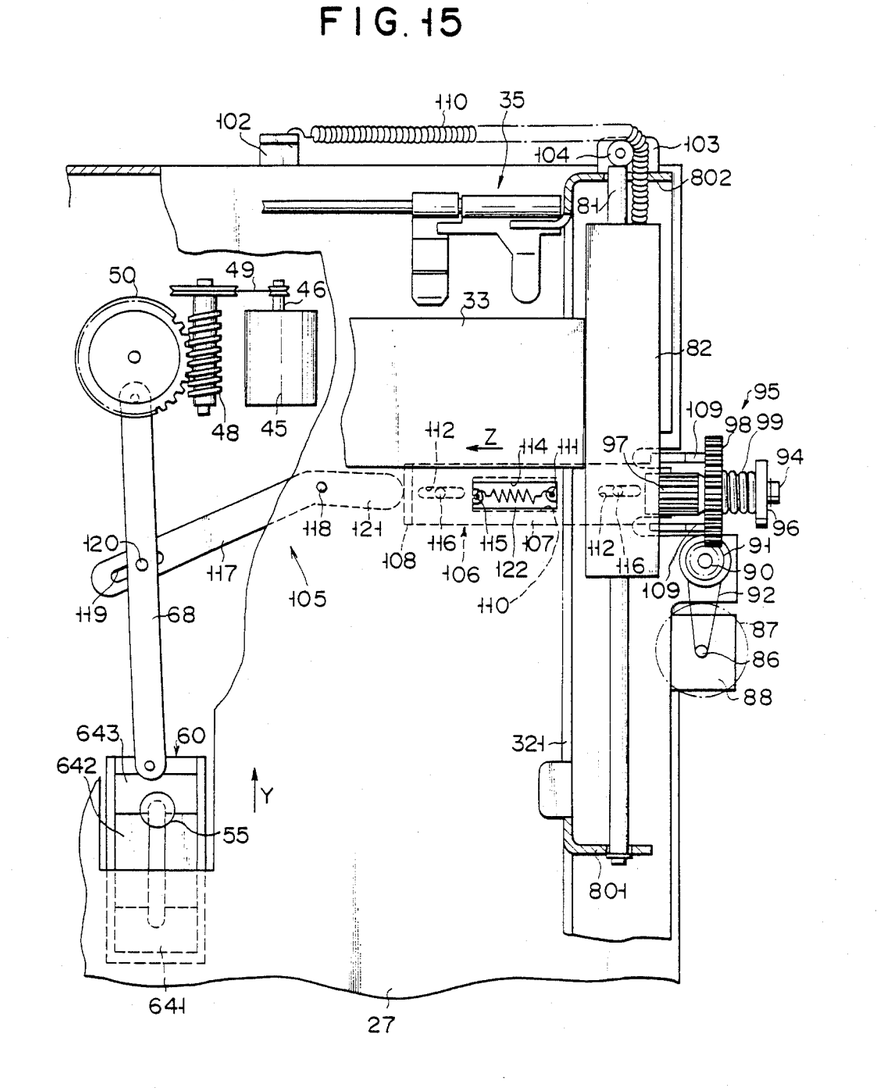
FIG. 15 is a plan view of the third driving mechanism in the nonreproducing condition.

In the nonreproducing condition, the regulation lever 117 of the control mechanism 105 is rotated counterclockwise (FIG. 9) about the pivot pin 118 upon movement of the drive lever 68 to the opposite direction of the arrow Y, as shown in FIG. 15. As regulation lever 117 is moved from the fifth position to the sixth position, the press member 106 is forced to move from the third position to the fourth position against the urging force of the coil spring 116 to the opposite direction of the arrow Z. Upon this movement of the press member 106, the contact segments 109 of the press member 106 abut against the second gear portion 98 which is then moved from the first position to the second position. The tapered surfaces 974 and 981 are separated from each other, and the first gear portion 97 is free to rotate.

In this condition, since the cartridge guide 82 is free to move, and the cartridge 33 is urged to the reproduction start position by the coil spring 100, it is forcibly returned to the reproduction start position by the urging force of the coil spring 100. When the cartridge guide 82 returns to the reproduction start position as mentioned manner, the cartridge guide 82 may not rebound from the reproduction start position because of the urging force of the coil spring 100. Accordingly, a conventionally used rebounce preventing device is not required in the player 10, and therefore the player results in simple construction.

The cartridge guide 82 is constantly urged to the reproduction start position by the coil spring 100, however the cartridge guide 82 is not returned to the reproduction start position as long as the turntable 28 is located at its upper position. Even if the cartridge 33 stops half-way down above the disc, because the gear 984 as the worm wheel of the second gear portion 98 of the clutch assembly 95 is meshed with worm 91.

As described above in detail, according to one embodiment of the present invention, the cartridge 33 is driven by the rotational force of the motor 87 when the turntable 28 is located in its upper position, that is, when the reproducing operation is performed. The cartridge 33 automatically returns to the reproduction start position when the turntable 28 is moved downward, that is, when the nonreproducing condition is maintained.

As shown in FIG. 13, the middle spindle 96 is rotated together with the second gear portion 98 by the urging force of the spring 99 when the clutch assembly 95 is kept in the power transmission enabling condition. In this condition, the clutch assembly 95 as a whole is rotated around the support shaft 94. Now assume that the middle spindle 96 is locked. The spring 99 is then rotated together with the second gear portion 98 with friction acting between the spring 99 and the the middle spindle 96. Therefore, the friction acts as a load on the motor 87, and the motor 87 must be driven at high output power, resulting in inconvenience. In the above embodiment, the clutch assembly 95 as a whole is rotated, and the relative movement between the spring 99 and the middle spindle 96 is completely eliminated, thus decreasing power loss and resulting in convenience.

What we claim is:

1. An apparatus having reproducing and non-reproducing conditions for reproducing signals recorded on a disc while in the reproducing condition, said apparatus comprising:

a turntable rotatably supporting the disc;
a cartridge movable between a reproduction start position and a reproduction end position;
first driving means for moving said cartridge from the reproduction start position to the reproduction end postion by a driving force thereof;
clutch means operatively interconnecting said cartridge and said first driving means and movable between engaged and disengaged positions respectively corresponding to the reproducing and non-reproducing conditions of the apparatus, said clutch means for (a) transmitting the driving force of said first driving means to said cartridge when said clutch means is in said engaged position to responsively move said cartridge in a reproducing direction between said reproduction start and reproduction end positions and (b) releasing said cartridge from the driving force of said first driving means when said clutch means is in said disengaged position to permit said cartridge to return to said reproduction start position; and first urging means operatively connected to said cartridge and said clutch means for urging said cartridge in a direction, opposite to said reproducing direction, towards said reproduction start position to move said cartridge into said reproduction start postion in response to said clutch means being moved into said disengaged position, and for holding said cartridge in the reproduction start position while said clutch means is in said disengaged position corresponding to the nonreproducing condition of the apparatus.

2. The apparatus according to claim 1, wherein said cartridge includes a rack extending in a moving direction thereof, and said clutch means includes:

a first gear rotatably disposed to mesh with said rack;

a second member held rotatable by said first driving means and movable between a first position where said second member is engaged with said first gear to rotate together therewith and a second position where said second member is disengaged from said first gear to rotate separately therefrom; and controlling means for bringing said second member to the first position in the reproducing condition and for bringing said second member to the second position in the nonreproducing condition.

3. The apparatus according to claim 2, wherein said first driving means includes a motor and a worm rotatably driven by said motor, and said second member includes a second gear meshed with said worm.

4. The apparatus according to claim 3, wherein said clutch means includes second urging means for urging said second gear from the second position to the first position, and said controlling means includes a press member separating from the second gear in the reproducing condition, thereby urging said second gear to the first position by said second urging means, and abuting against said second gear in the nonreproducing condition, thereby moving said second gear to the second position against the urging force of said second urging means.

5. The apparatus according to claim 4, wherein said clutch means includes a fixed support shaft and a cylindrical body which is rotatably supported around said fixed support shaft and which has an outer circumferential surface and flanges at both ends thereof, said first gear is rotatably supported around the outer circumferential surface of said cylindrical body, and has a first outer surface on which a gear is formed to mesh with said rack and a cross section of which has a large diameter, a second outer surface which is coaxial with said first outer surface and a cross section of which has a small diameter, and a first engaging surface formed between said first and second outer surfaces, and said second gear is rotatably and slidably fitted around said second outer surface of said first gear, and has an inner surface opposing said second outer surface, a second engaging surface engageably opposing said first engaging surface, a flange formed on that part of an outer surface of the second gear which faces to said second engaging surface, a third outer surface which faces to said inner surface and a cross section of which has a small diameter, and a gear formed on an outer surface of said flange to mesh with said worm.

6. The apparatus according to claim 5, wherein said second urging means includes a coil spring which is wound around said third outer surface of said second gear, one end of which abuts against said flange of said second gear and the other end of which abuts against that flange of the cylindrical body which is positioned on the side of said second outer surface, whereby said first engaging surface of said first gear engages with said second engaging surface of said second gear to provide a power transmission enabling condition by the urging force of said second gear.

7. The apparatus according to claim 6, wherein said first and second engaging surfaces comprise tapered surfaces, respectively.

8. The apparatus according to claim 4, wherein said turntable is vertically movable, and further comprises second driving means for driving said turntable to an upper position to place the video disc on said turntable in the reproducing condition, and for driving said turntable to a lower position to allow removal of the video disc therefrom in the nonreproducing condition.

9. The apparatus according to claim 8, wherein said press member is movable between a third position where said press member is separated from said second gear and a fourth position where said press member abuts against said second gear, and said controlling means includes a regulation member which brings said press member to the third position when said turntable is in the upper position, and which brings said press member to the fourth position when said turntable is in the lower position.

* * * * *